United States Patent [19]
Trammell, Jr.

[11] 3,906,807
[45] Sept. 23, 1975

[54] BICYCLE DRIVE ASSEMBLY

[75] Inventor: Earl M. Trammell, Jr., St. Louis, Mo.

[73] Assignee: Cycle-Drive Corporation, St. Louis, Mo.

[22] Filed: Nov. 19, 1973

[21] Appl. No.: 417,060

Related U.S. Application Data
[63] Continuation-in-part of Ser. No. 229,898, Feb. 28, 1972, Pat. No. 3,779,099.

[52] U.S. Cl. ..................... 74/143; 74/36; 74/526; 280/256
[51] Int. Cl. ............................................ F16h 21/14
[58] Field of Search ..... 74/66, 67, 36, 217 B, 594.3, 74/536, 143, 142; 280/259, 256, 257

[56] References Cited
UNITED STATES PATENTS

| | | | |
|---|---|---|---|
| 302,098 | 7/1884 | Cordona | 280/256 |
| 386,942 | 7/1888 | Thomas | 74/67 |
| 984,562 | 2/1911 | Holmberg | 74/36 |
| 2,137,263 | 11/1938 | Bradt et al. | 74/526 |
| 2,429,313 | 10/1947 | Gilbert | 74/526 |
| 3,012,447 | 12/1961 | Wallace | 74/526 |

*Primary Examiner*—Wesley S. Ratliff, Jr.
*Attorney, Agent, or Firm*—Cohn, Powell & Hind

[57] ABSTRACT

A drive assembly for a physically propelled vehicle such as a bicycle having a crank arm operatively connected to a drive member rotatively mounted on a drive axis for rotating the drive member, and a connector pivotally connected to an advance-crank arm mounted to the crank arm. Control mechanism pivotally connects the connector to the crank arm for automatically shifting pedal force from the crank arm to the advance-crank arm, and for later automatically shifting the pedal force back to the crank arm upon rotation of the crank arm and advance-crank arm. A clutch connects the advance-crank arm to the crank arm for relative pivotal movement in only one direction. The control mechanism includes a control arm pivotally connected to the crank arm, a control connector pivotally connected to the connector and pivotally connected to the control arm, and resilient means tending to pivot the control arm relative to the crank arm at the predetermined angular position of the crank arm to shift the pedal force from the crank arm to the advance-crank arm. Further, the control mechanism includes a stop connecting the control arm and crank arm to preclude relative pivotal movement at a predetermined angular position of the pivot connection of the connector and the advance-crank arm to shift the pedal force from the advance-crank arm to the pivot connection of the control connector and control arm. Other stops connect the connector and the advance-crank arm, and connect the crank arm and control arm to maintain the angular relation constant between the connector and the control connector from approximately bottom dead center to approximately top dead center of the crank arm. A spring interconnects the connector and the control connector and tends to close the angle therebetween.

11 Claims, 12 Drawing Figures

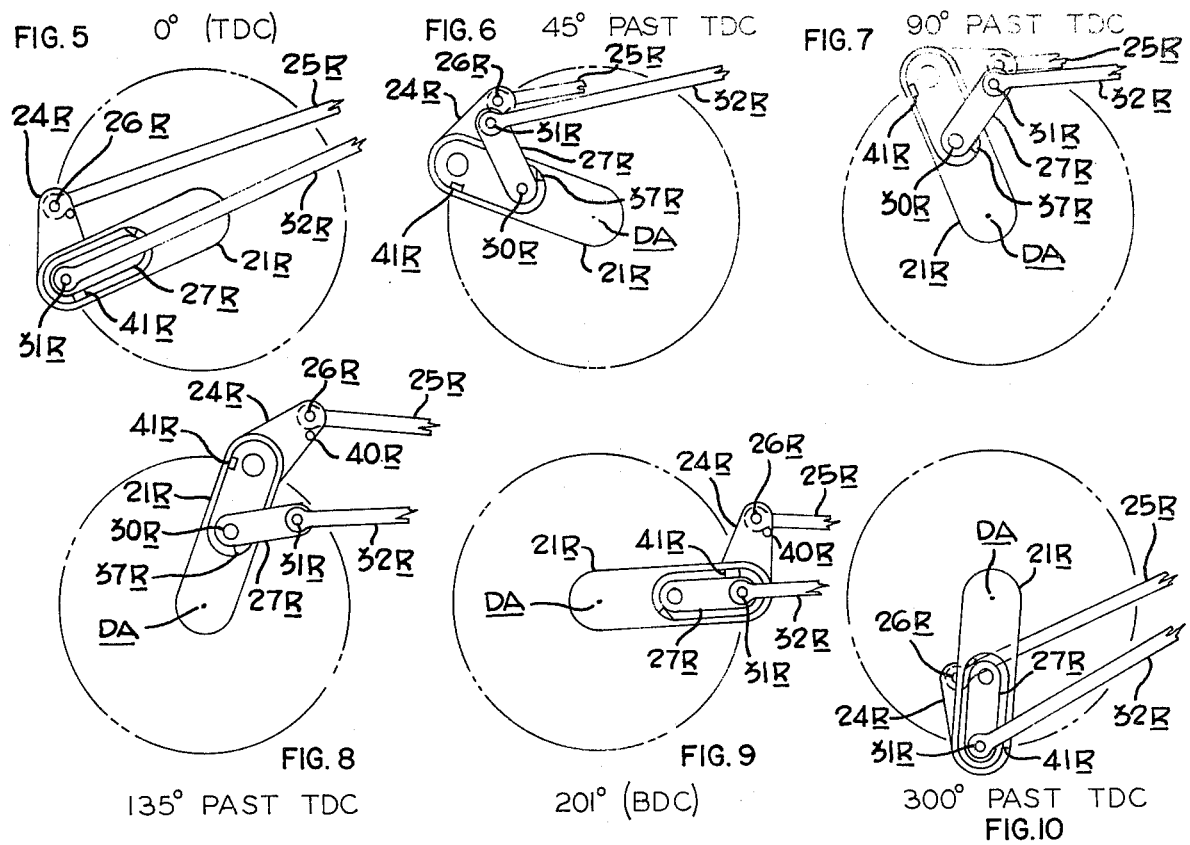
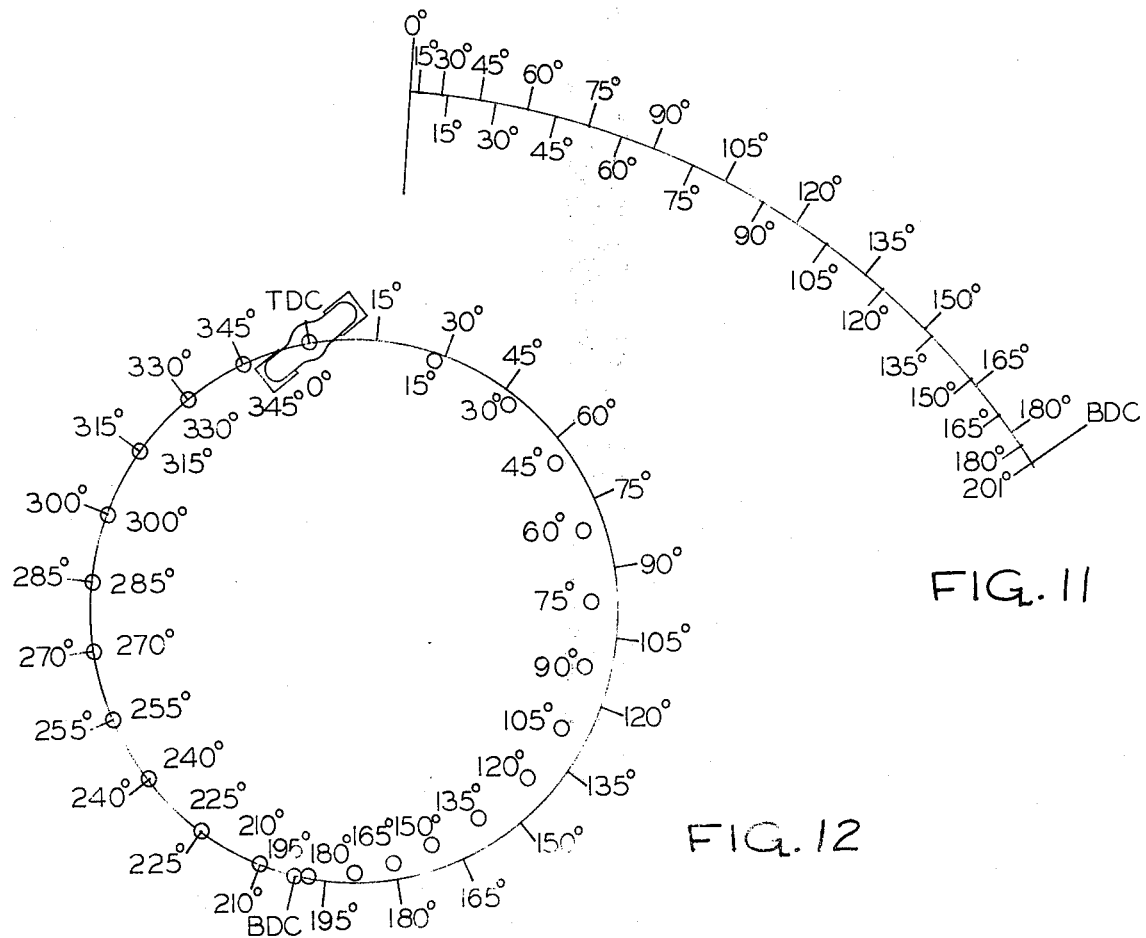

BICYCLE DRIVE ASSEMBLY

CROSS-REFERENCE TO RELATED APPLICATION

This application is a continuation-in-part of application Ser. No. 229,898, filed Feb. 28, 1972 now U.S. Pat. No. 3,779,099, entitled "Bicycle Drive Assembly."

BACKGROUND OF THE INVENTION

This invention relates generally to improvements in a drive assembly for a physically-propelled vehicle, and more particularly to an improved bicycle drive assembly.

A heretofore conventional bicycle drive assembly includes a crank shaft having a pedal which is connected to a sprocket, the pedal and crank shaft being turned directly with a rotary motion imparted by the rider. This rotary action requires certain leg movements and a resultant transfer of physical power that is not efficient.

There have been various types of drives developed for propelling a bicycle with substantially reciprocating or oscillating pedal action, but these prior drive assemblies have met with no success because they too are inefficient in their transfer of driving power through well-known ratchet pawl and linkage mechanisms.

SUMMARY OF THE INVENTION

The present drive assembly includes a mechanism for shifting the pedal force from the crank arm to an advance-crank arm and back again to the crank arm during the pedal power stroke. This invention provides for a more positive control over the pedal action which in turn permits a more efficient rate of pedal travel to be established during the pedal power portion of the crank arm cycle.

The drive assembly eliminates the need for any predetermined amount of pedal pressure to be applied in order to effect a shift to pedal force. Instead, the pedal force is automatically shifted at certain or at fixed degrees of the crank arm travel and such action is independent of any pedal pressure. It provides for the same continuous rate of pedal travel for every crank arm cycle.

The drive assembly provides control over the rate of pedal travel in self-propelled devices, and permits the rate of pedal travel to be calculated and adjusted to more efficiently respond to the pedal forces. Dimensional changes in the structure of the drive assembly afford a means for easily adjusting and arriving at the most efficient rate of pedal travel or speed. Specifically, during dead top center and early degrees of crank arm travel, when conventional crank systems exert little turning effort to the crank arm, the present drive assembly provides effective torque for doing so and further serves to establish an efficient rate of pedal speed throughout the pedal cycle. The assembly provides an early turning effort, and establishes its maximum speed and torque near the middle range of its pedal downstroke, all of which makes for a more effective pedal power portion of the crank arm cycle.

The present drive assembly can be utilized to establish the same advantages for rotary pedal action as it does for reciprocating or oscillating pedal action. This is basically accomplished by transferring the foot pedal to the control arm of the assembly, which causes the pedal to travel in a rotary cycle. It will be seen that the rate of rotary pedal action achieves the same advantages during top dead center and early degrees of crank arm travel as does the reciprocating or oscillating pedal. In fact, the rotary pedal rate of travel for the 360° crank arm cycle is relatively the same as accomplished by the reciprocating or oscillating pedal travel.

The drive assembly includes a crank arm operatively connected to a drive member rotatively mounted on a drive axis for rotating the drive member, and a one-way clutch connecting the advance-crank arm to the crank arm for pivotal movement of the advance-crank arm relative to the crank arm in only one direction. A connector is pivotally connected to the advance-crank arm. Pedal and guide means are operatively connected to the connector for moving the connector in a predetermined path. A control means pivotally connects the connector to the crank arm for automatically shifting pedal force from the crank arm to the advance-crank arm and for later automatically shifting the pedal force back to the crank arm upon rotation of the crank arm and advance-crank arm.

The control means includes a control connector, and a stop means that connects the connector means and the control connector to maintain the angular relation constant between the connector means and the control connector from approximately bottom dead center to approximately top dead center of the crank arm.

The control means further includes a control arm pivotally connected to the crank arm, the control connector being pivotally connected to the connector means and to the control arm, and resilient means tending to pivot the control arm relative to the crank arm at a predetermined angular position of the crank arm to shift the pedal force from the crank arm to the advance-crank arm.

The advance-crank arm is connected to the crank arm by a clutch means that permits relative pivotal movement about a first pivot axis in a direction opposite to that of the crank arm rotation about the drive axis. The pivot connection between the connector means and the advance-crank arm is about a second pivot axis located forwardly in the direction of drive member rotation relative to the said first pivot axis when the said second pivot axis is located substantially at the top dead center position. The control arm rotates relative to the crank arm in the same direction as the crank arm rotation about the drive axis to shift the pedal force from the crank arm to the advance-crank arm. The pivot connection between the control arm and the control connector is about a third pivot axis located substantially coincident with the said first pivot axis and movable forwardly out of alignment in the direction of the crank arm rotation at the said predetermined angular position of the crank arm.

The control means includes a stop means that connects the control arm and crank arm to preclude relative pivotal movement at a predetermined angular position of the pivot means of the connector means and the advance-crank arm to shift the pedal force from the advance-crank arm to the pivot means of the control connector and control arm.

Further, the control means includes a stop means that connects the connector means and the advance-crank arm, and another stop means that connects the crank arm and control arm to maintain the angular relation constant between the connector means and the control connector from approximately bottom dead center to approximately top dead center of the crank arm. The stop means connecting the crank arm and the control arm maintains the pivot means between the control arm and the control connector axially coincident with the pivot means provided by the clutch means.

A resilient means such as a spring interconnects the connector means and the control connector, and tends to close the angle therebetween.

BRIEF DESCRIPTION OF THE DRAWINGS

FIG. 3 is a cross-sectional view of the drive assembly as seen on line 3—3 of FIG. 1;

FIGS. 5–10 are six diagrams, illustrating the motion of the drive assembly during its cycle;

FIG. 11 is a diagram showing the rate of pedal travel of the present drive assembly as compared to the pedal rate with the structure using a conventional crank shaft and connector arm, and FIG. 12 is a diagram illustrating the crank arm travel with the drive assembly shifted and the pedal affixed to the pivot means of the control arm and control connector, to illustrate rotary pedal action.

DESCRIPTION OF THE PREFERRED EMBODIMENT

Figure 1:
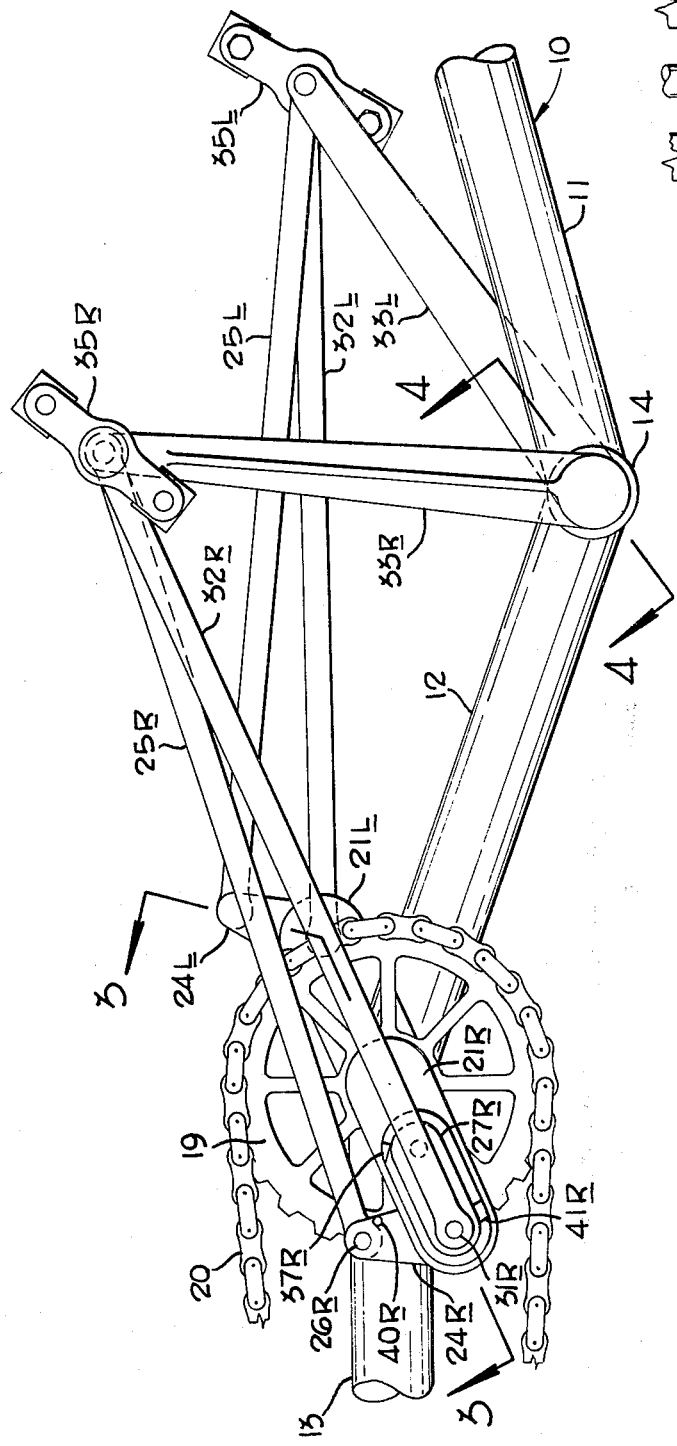
FIG. 1 is a fragmentary, side-elevational view of a bicycle incorporating the improved drive assembly.
Figure 2:
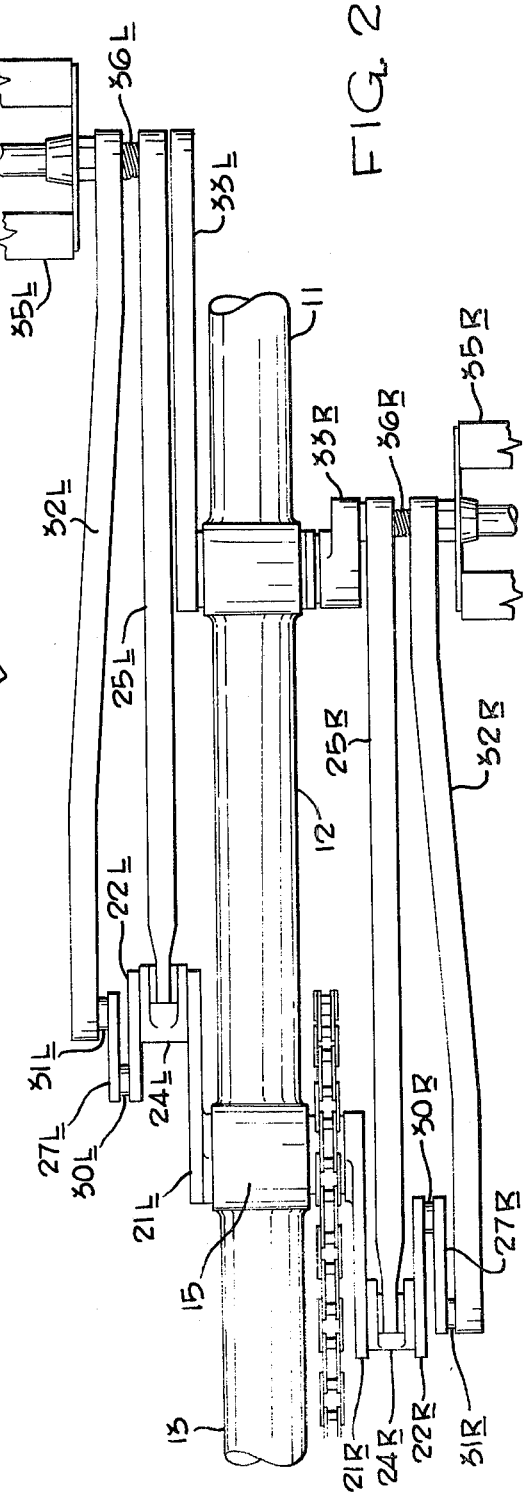
FIG. 2 is a top plan view of the assembly shown in FIG. 1.

Referring now by characters of reference to the drawings, and first to FIG. 1, it is seen that the bicycle includes a frame generally indicated by 10 having frame portions 11, 12 and 13 interconnected by bearing journals 14 and 15. Otherwise, the frame 10 can be substantially conventional such as that disclosed in the co-pending application, Ser. No. 229,898, mentioned previously.

As is best seen in FIG. 3, a crank-shaft 16 is rotatively mounted in ball bearings within the bearing journal 15, the crank-shaft 16 defining a drive axis DA. A sprocket 19, constituting a drive member, is attached to and rotatable with the crank-shaft 16, and is located on the right hand side of the frame 10. As is conventional, the sprocket 19 is connected to the drive wheel of the bicycle by an endless chain 20 (FIG. 1) in the conventional manner.

It will be understood that the mechanism of the drive assembly actuated by the rider's right foot is the same as the mechanism provided for the rider's left foot except that the component parts are appropriately arranged so that when the rider's one foot is substantially in its uppermost position, the other foot is substantially in or near its lowermost position. Consequently, a detailed description of the mechanism for the rider's right foot will suffice for the mechanism for the left foot, and the corresponding component parts will be given identical reference numbers except that the mechanism for the rider's right foot will bear the suffix R and the mechanism for the rider's left foot will bear the suffix L.

The crank shaft 16 includes a crank arm 21R that rotates on the same drive axis DA as the sprocket 19. Attached to and forming a part of the crank arm 21 is a laterally spaced and reversely extending crank arm portion 22R. Disposed between and interconnecting the crank arm 21R and reverse crank arm portion 22R is a one-way clutch 23R, the one-way clutch 23R connecting the crank arm 21R to an advance-crank arm 24R. The one-way clutch 23R enables rotation of the advance-crank arm 24R relative to the crank arm 21R in only one direction, that direction being opposite to the rotation of crank arm 21R about the drive axis DA.

A connector 25R, constituting a connector means, is pivotally connected by a pivot means 26R to the opposite end of the advance-crank arm 24R.

A control means includes a control arm 27R pivotally connected by a pivot means 30R to the reverse crank arm portion 22R, and hence to the crank arm 21R. The opposite end of the control arm 27R is pivotally connected by a pivot means 31R to a control connector 32R.

A pedal and guide means includes an arm 33R secured to a stub shaft 34R that is rotatively mounted in the bearing journal 14. The stub shaft 34R defines a fixed axis FA. The outer end of the arm 33R is pivotally connected to the opposite ends of the connector 25R and the control connector 32R. Carried on the outer end of the arm 33R and on the same pivot connection with the outer ends of the connector 25R and control connector 32R, is a pedal 35R adapted to receive the rider's right foot for actuating the arm 33R.

For reasons which will later appear, a control torsion soring 36R, constituting a resilient means, is located about the pivot connection between and operatively attached to the connector 25R and the control connector 32R, the spring 36R tending to close the angle therebetween.

The control means further includes a stop 37R carried by the reverse crank arm portion 22R and engageable with the control arm 27R in a predetermined angular position of the crank arm 21R to stop the relative rotation of the control arm 27R and crank arm 21R, and to shift the pedal force from the pivot means 26R to the pivot means 31R.

Another stop 40R is carried by the advance-crank arm 24R and is engageable with the connector 25R when the crank arm 21R is located substantially in its bottom dead center position, and serves to preclude relative rotation of the advance-crank arm 24R and connector 25R about its pivot means 26R in one direction as the crank arm 24R moves from substantially its bottom dead center position to substantially its top dead center position.

Still another stop 41R is carried by the reverse crank arm portion 22R and is engageable with the control arm 27R when the crank arm 24R is located substantially in its bottom dead center position, and serves to maintain the pivot axis of pivot means 31R coincident with the pivot axis of the clutch 23R from substantially the bottom dead center position of the crank arm 24R to substantially its top dead center position. Moveover, as will appear, the stops 37R and 40R maintain the angular relation constant between the connector 25R and the control connector 32R during this movement of the crank arm 24R from substantially the bottom dead center position to substantially the top dead center position.

Figure 5:
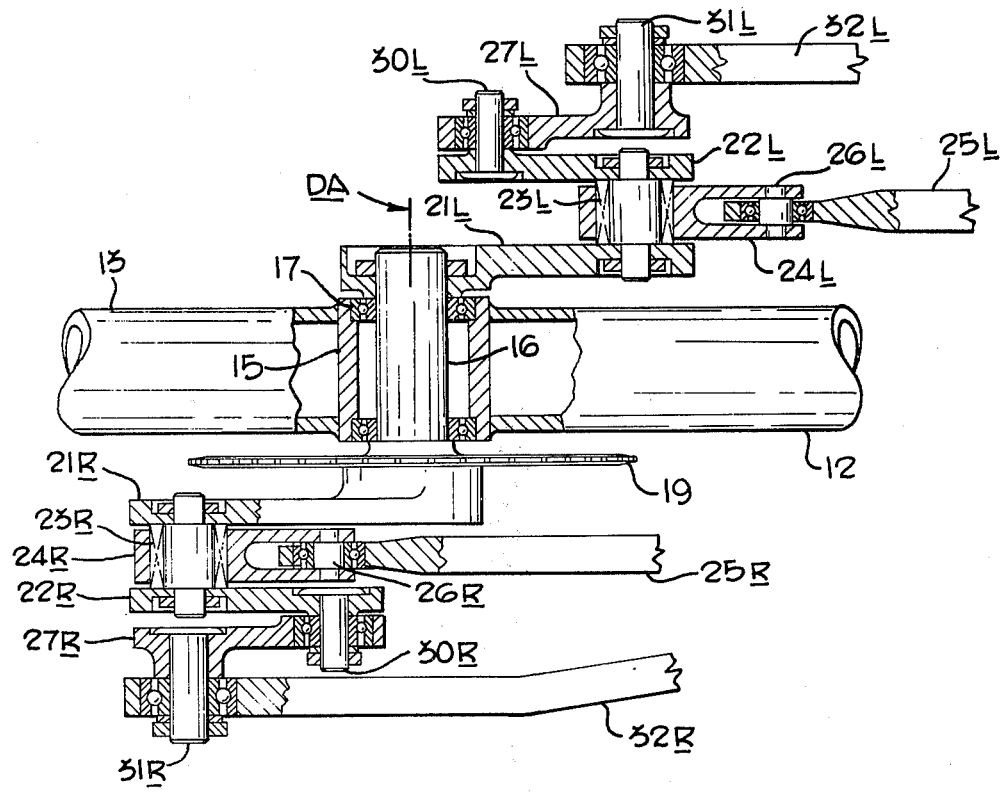
Figure 4:
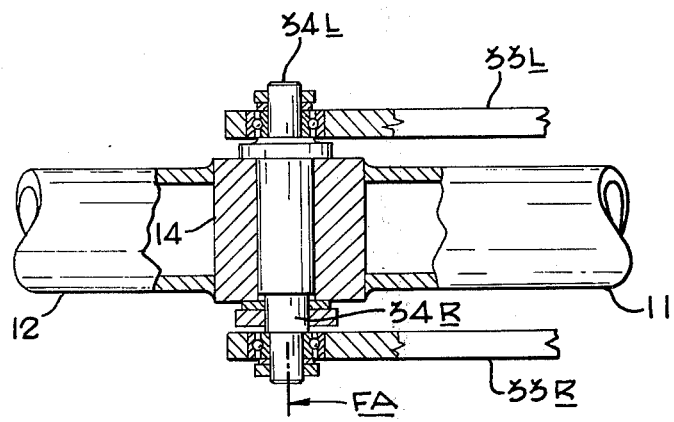
FIG. 4 is a cross-sectional view as seen on line 4—4 of FIG. 1.

The operation of the drive assembly is perhaps best shown by the diagramatic illustrations of FIGS. 5–10. The first diagram of FIG. 5 shows the arrangement of the component parts of the drive assembly in top dead center or 0°. In this position, the crank arm 21R is located in the top dead center position and the control arm 27R is disposed in alignment with the crank arm 21R so that the pivot axis of pivot means 31R is coincident with the pivot axis of the one-way clutch 23R. The pivot axis of the pivot means 26R interconnecting the advance-crank arm 24R and the connector 25R is located forwardly of and on the same projected circular path of travel of the pivot axis of the clutch 23R in the direction of crank arm travel.

In this position, the pivot means 31R, 30R and the drive axis DA are substantially in alignment. It will be understood that the control torsion spring 36R is tending to close the angle between the connector 25R and the control connector 32R. In this position, the arm 33R is located in its raised limit. It will now be assumed that a pedal force is applied to the pedal 35R.

Substantially at the top dead center position, the force of the control torsion spring 36R will rotate the control arm 27R relative to the crank arm 21R in the direction of crank arm travel, and move the pivot axis of the pivot means 31R forwardly out of alignment with the pivot axis of the clutch 23R. Immediately and automatically, the pedal force which was applied to the crank arm 24R by the control connector 32R at the coincident pivot axes of the pivot means 31R and clutch 23R, is shifted forwardly to the pivot means 26R between the advance crank arm 24R and the connector 25R. When the pedal force is shifted to the pivot means 26R, the advance-crank arm is automatically locked in relative position to the crank arm 24R by the one-way clutch 23R. As the crank arm 21R continues to rotate under the action of the pedal force applied to the pivot means 26R, the control arm 27R will also continue to rotate relative to the crank arm 21R as is shown in the second diagram of FIG. 6 illustrating the crank arm location at 45° past top dead center.

At a predetermined angular position of the crank arm 21R, such as at 90° past top dead center as illustrated in the third diagram of FIG. 7, which represents substantially the most favorable torque obtained from the pedal force applied through the pivot means 26R, the control arm 27R will engage the stop 37R that precludes further relative rotation of the control arm 27R and the crank arm 21R in this direction. Immediately and automatically, the pedal force is shifted from the pivot means 26R to the pivot means 31R interconnecting the control arm 27R and the control connector 32R. Because the pivot axes of the pivot means 26R and 31R are relatively close together, this automatic shifting of pedal force is substantially imperceptible to the rider. As the crank arm is rotated further by the pedal force applied to the pivot means 31R through the control connector 32R as is shown in the fourth diagram of FIG. 8, the advance-crank arm 24R will now rotate relative to the crank arm 21R as permitted by the one-way clutch 23R.

When the crank arm 21R moves to the bottom dead center position upon further rotation, the control arm 27R will pivot relative to the reverse crank arm portion 22R in a direction away from the stop 37R until the crank arm 21R is located in substantially the bottom dead center position illustrated by the diagram in FIG. 9. In this bottom dead center position of the crank arm 21R, the control arm 27R engages the stop 41R and the pivot axes of the pivot means 31R and the clutch 23R are again coincident. At the same time, the connector 25R will engage the stop 40R to prevent the included angle between the advance-crank arm 24R and the connector 25R from becoming less than its angle at top dead center and bottom dead center. This restriction in angle prevents the control arm 27R from pivoting relative to the crank arm 21R during movement of the crank arm 21R between the bottom dead center position and the top dead center position. In addition, the control torsion spring 36R is still providing a tension pull on the control arm 27R through the control connector 32R, and tends to hold the control arm 27R against the stop 41R.

Upon continued rotation of the crank arm 21R as shown by diagram of FIG. 10, it will be understood that the control arm 27R is maintained in alignment with the crank arm 21R, and that the included angle between the advance-crank arm 24R and the connector 25R is maintained constant as described previously. However, the advance-crank arm 24R will continue to pivot relative to the crank 21R as permitted by the one-way clutch 23R until the crank arm 21R reaches substantially the top dead center position as shown in the first diagram of FIG. 5, thereby providing a complete cycle of operation. The pedal action from approximately the bottom dead center position of the crank arm 21R to approximately the top dead center position is controlled by the crank arm 21R and the control connector 32R.

FIG. 11 is a diagram that illustrates the rate of pedal travel of this drive assembly as compared to the rate of pedal travel using a conventional crank arm and connector. It will be understood that with the conventional connector, the rate of pedal travel is so reduced during the first 30° of crank arm rotation so as to hardly permit any turning effort to the crank arm. In addition, maximum pedal speed and torque are reached late in the pedal down cycle. By comparison, this drive assembly provides an early turning effort and establishes its maximum pedal speed and torque near the middle range of the pedal downstroke, all of which makes for a more effective pedal power cycle. This diagram does show that with the particular structural arrangement of the present drive assembly, the arm 33R during the last portion of the power stroke will continue to move downwardly a short distance as the crank arm 21R moves from 180° to approximately 201° or the bottom dead center position. However, when the crank arm 21R is located in the 180° position, the crank arm 21L is located in its top dead center position and the associated arm 33L will be located in its raised position. Accordingly, the arm 33L will start to move down from its raised position while 33R continues to move down a short distance as described above as the crank arm 21R moves from its 180° position to the bottom dead center position. This movement of the arms 33R and 33L enables a smooth transfer of pedal force from one pedal 35R to the other pedal 35L, and back again, at the start of each pedal downstroke.

It will also be understood that the present drive assembly can be utilized to accomplish the same advantages for rotary pedal action as it does for reciprocating or oscillating pedal action. This is accomplished basically by shifting the component parts of the drive assembly around until the top dead center position of the crank arm is located substantially at the top of the cycle, and transferring the pedals 35R and 35L from the arms 33R and 33L to a connection with the pivot means 31R and 31L between the control arms 27R and 27L and the control connectors 32R and 32L, as is illustrated diagramatically in FIG. 12. FIG. 12 shows the crank arm travel of 360° with every 15° of crank arm indicated. The "O" markings indicate the exact position of the pedal 35R, as represented by the pivot axis of pivot means 31R, for every 15° of crank arm travel. The small degree number markings directly underneath the "O" marks indicate the exact position of the crank arm at the particular position of the pedal. It will be understood that the rate of rotary pedal action obtains the same advantages during top dead center and the early degrees of crank arm travel as does the reciprocating or oscillating acting pedal. In fact, the rotary pedal rate of travel for the 360° cycle is relatively the same as accomplished by the reciprocating or oscillating pedal travel.

For example, when the foot pedal 35R is at approximately 29° past the top dead center, the crank arm is at 15°, thereby indicating that pedal speed during this portion of the cycle past dead top center has been almost twice that of the conventional crank systems. It will be further understood that this faster than conventional rate of pedal speed continues until approximately 90° past top dead center, at which time the pedal speed starts to remain constant and then gradually retards until it reaches the zero speed at bottom dead center. Then, from bottom dead center to top dead center, the rate of pedal action is conventional.

I claim as my invention:

1. A drive assembly for a physically-propelled vehicle comprising:
   a. a drive member rotatively mounted on a drive axis,
   b. a crank arm operatively connected to the drive member for rotating the drive member,
   c. an advance-crank arm connected to the crank arm,
   d. connector means pivotally connected to the advance-crank arm by a first pivot means spaced from the connection of the advance-crank arm to the crank arm,
   e. pedal and guide means operatively connected to the connector means for moving the connector means in a predetermined path,
   f. control means pivotally connecting the connector means to the crank arm for shifting pedal force from the crank arm to the advance-crank arm, and for later shifting the pedal force back to the crank arm upon rotation of the crank arm,
   g. clutch means connecting the advance-crank arm to the crank arm for relative pivotal movement in only one direction, and
   h. the control means including a pivot means between the crank arm and connector means and movable forwardly relative to the crank arm in the direction of crank arm travel at a predetermined angular position of the crank arm to shift the pedal force from the crank arm to the advance-crank arm.

2. A drive assembly for a physically-propelled vehicle comprising:
   a. a drive member rotatively mounted on a drive axis,
   b. a crank arm operatively connected to the drive member for rotating the drive member,
   c. an advance-crank arm connected to the crank armr,
   d. connector means pivotally connected to the advance-crank arm by a first pivot means spaced from the connection of the advance-crank arm to the crank arm,
   e. pedal and guide means operatively connected to the connector means for moving the connector means in a predetermined path,
   f. control means pivotally connecting the connector means to the crank arm for shifting pedal force from the crank arm to the advance-crank arm, and for later shifting the pedal force back to the crank arm upon rotation of the crank arm,
   g. clutch means, providing a pivot means, connecting the advance-crank arm to the crank arm for relative pivotal movement in only one direction, and
   h. the control means including:
      1. a control arm pivotally connected to the crank arm by a second pivot means,
      2. a control connector pivotally connected to the connector means and pivotally connected to the control arm by a third pivot means spaced from the said second pivot means, and
      3. resilient means tending to pivot the control arm forwardly relative to the crank arm in the direction of crank arm travel to shift the pedal force from the crank arm to the advance-crank arm at a predetermined angular position of the crank arm.

3. A drive assembly as defined in claim 2, in which:
   i. the clutch means permits rotation of the advance-crank arm relative to the crank arm about a pivot axis in a direction opposite to that of the crank arm rotation about the drive axis,
   j. the first pivot means between the connector means and the advance-crank arm is about a pivot axis located forwardly in the direction of drive member rotation relative to the said pivot axis of the clutch means when the pivot axis of the first pivot means is located substantially at the top dead center position, and
   k. the control arm rotates relative to the crank arm in the same direction as the crank arm rotation about the drive axis to shift the pedal force from the crank arm to the advance-crank arm.

4. A drive assembly as defined in claim 3, in which:
   l. the third pivot means between the control arm and the control connector is about a pivot axis located substantially coincident with the pivot axis of the clutch means and movable forwardly out of alignment in the direction of crank arm rotation at the said predetermined angular position of the crank arm upon rotation of the control arm.

5. A drive assembly as defined in claim 4, in which:
   m. the pivot axis of the third pivot means is disposed radially outward of the second pivot means connecting the control arm with the crank arm.

6. A drive assembly as defined in claim 2, in which:
   i. the control means includes a stop means interconnecting the control arm and the crank arm to preclude relative pivotal movement at a predetermined angular position of the first pivot means connecting the connector means and the advance-crank arm to shift the pedal force from the advance-crank arm to the third pivot means connecting the control connector and control arm.

7. A drive assembly as defined in claim 2, in which:
   i. the control means includes:
      1. a stop means interconnecting the connector means and the advance-crank arm, and 2. another stop means interconnecting the crank arm and control arm, these said stop means maintaining the angular relation constant between the connector means and control connector from approximately bottom dead center to approximately top dead center of the crank arm.

8. A drive assembly as defined in claim 7, in which:
j. the stop means interconnecting the crank arm and the control arm maintains the third pivot means between the control arm and the control connector axially coincident with the pivot means provided by the clutch means for approximately the bottom dead center to approximately the top dead center of the crank arm.

9. A drive assembly as defined in claim 2, in which:
i. the resilient means interconnects the connector means and the control connector and tends to close the angle therebetween that connector means portion between the pivotal connection of the connector means and control connector and the first pivot means and that control connector portion between the pivotal connection of the connector means and control connector and the third pivot means.

10. A drive assembly as defined in claim 2, in which:
i. the control means includes:
  1. a first stop means interconnecting the control arm and crank arm to preclude relative pivotal rotation at a predetermined angular position of the first pivot means connecting the connector means and advance-crank arm to shift the pedal force from the advance-crank arm to the third pivot means connecting the control connector and control arm,
  2. a second stop means interconnecting the connector means and the advance-crank arm, and
  3. a third stop means interconnecting the crank arm and the control arm to maintain the angular relation constant between the connector means and the control connector from approximately bottom dead center to approximately top dead center of the crank arm, the third stop means maintaining the third pivot means between the control arm and the control connector axially coincident with the pivot means provided by the clutch means, and
j. the resilient means interconnects the connector means and the control connector and tends to close the angle therebetween that connector means portion between the pivotal connection of the connector means and control connector and the first pivot means and that control connector portion between the pivotal connection of the connector means and control connector and the third pivot means.

11. A drive assembly as defined in claim 10, in which:
k. the clutch means permits rotation of the advance-crank arm relative to the crank arm about a pivot axis in a direction opposite to that of the crank arm rotation about the drive axis,
l. the first pivot means between the connector means and the advance-crank arm is about a pivot axis located forwardly in the direction of drive member rotation relative to the said pivot axis of the clutch means when the pivot axis of the first pivot means is located substantially at the top dead center position.
m. the control arm rotates relative to the crank arm in the same direction as the crank arm rotation about the drive axis to shift the pedal force from the crank arm to the advance-crank arm, and
n. the third pivot means between the control arm and the control connector is about a pivot axis located substantially coincident with the pivot axis of the clutch means and movable forwardly out of alignment in the direction of crank arm rotation at the said predeteremined angular position of the crank arm, the pivot axis of the third pivot means being disposed radially outward of the second pivot means connecting the control arm with the crank arm.

* * * * *